United States Patent [19]
Bobeck

[11] 3,786,453
[45] Jan. 15, 1974

[54] MAGNETIC SINGLE WALL DOMAIN EXPANSION CIRCUIT

[75] Inventor: Andrew Henry Bobeck, Chatham, N.J.

[73] Assignee: Bell Telephone Laboratories, Incorporated, Murray Hill, N.J.

[22] Filed: Dec. 24, 1972

[21] Appl. No.: 308,996

[52] U.S. Cl. 340/174 TF, 340/174 AA, 340/174 EB, 340/174 SC
[51] Int. Cl. .......... G11c 11/14
[58] Field of Search .......... 340/174 TF

[56] References Cited

UNITED STATES PATENTS 3,678,479 7/1972 Owens .......... 340/174 TF

*Primary Examiner*—James W. Moffitt
*Attorney*—H. M. Shapiro

[57] ABSTRACT

A conductor access bubble expansion and propagation arrangement is realized by interleaving the legs of a sinusoid-shaped conductor with narrow regions of relatively low moment material defined in a layer in which domains can be moved. Elongated low moment regions permit domain expansion in response to drive pulses applied to the conductor whereas a variation in the lengths of consecutive regions allows first growth and the reduction of the length of domains to a normal operating size as a domain is advanced along the axis of the sinusoid. A bubble expansion arrangement suitable for bubble detection and for a turn geometry for a closed loop bubble channel results.

9 Claims, 5 Drawing Figures

MAGNETIC SINGLE WALL DOMAIN EXPANSION CIRCUIT

FIELD OF THE INVENTION

This invention relates to magnetic single wall domain (or magnetic bubble) propagation arrangements and more particularly to arrangements adapted to expand such domains during operation for enhanced detection.

BACKGROUND OF THE INVENTION

Two well-known modes of operation for achieving single wall domain movement are commonly known as "conductor access" and "field access." The first employs electrical conductors which are arranged in a pattern adjacent a layer in which single wall domains can be moved. The conductors are pulsed in sequence for generating consecutively offset field gradients for moving a domain. The second employs magnetically soft elements, arranged in a periodic pattern, responsive to a magnetic field reorienting in the plane of domain movement of generate similar field gradients.

The detection of single wall domains is enhanced by increasing the size of the domain for the detection operation as is well known. In conductor access arrangements, it is convenient to form a single elongated conductor loop operative to elongate a domain transverse to the path of domain movement for this purpose. In field access arrangements, the geometry of the pattern of elements itself is modified to operate responsive to the reorienting in-plane field to expand a domain in a detection ara in a direction either transverse or parallel to the axis of movement.

In some propagation techniques, on the other hand, constraints on the geometry of, say, the electrical conductors in a conductor access arrangement do not allow for domain expansion in any straightforward manner, For example, copending application Ser. No. 309,056 of A. H. Bobeck, J. A. Copeland, and R. Wolfe filed Nov. 24, 1972, discloses a straight line conductor access arrangement where regions forbidden to domains are included in the domain layer. The problem which arises as a consequence is the achievement of domain expansion in a manner consistent with the normal propagation sequence along such a straight line conductor with respect to which domain movement is determined by a periodic structuring of the domain layer.

BRIEF DESCRIPTION OF THE INVENTION

In accordance with one aspect of the present invention, the straight line conductor follows a sinusoidal path in the area defining a turn in a closed loop domain channel. The amplitude of the sinusoid is relatively large and the legs thereof are interleaved as well as bounded by regions forbidden to doamins. The interleaved forbidden regions are made sufficiently narrow to permit domains to be driven through them. The turn geometry is fully compatible with the aforementioned straight line conductor access arrangement and results in domain expansion for enhancement of output signals.

DETAILED DESCRIPTION

Figure 1:
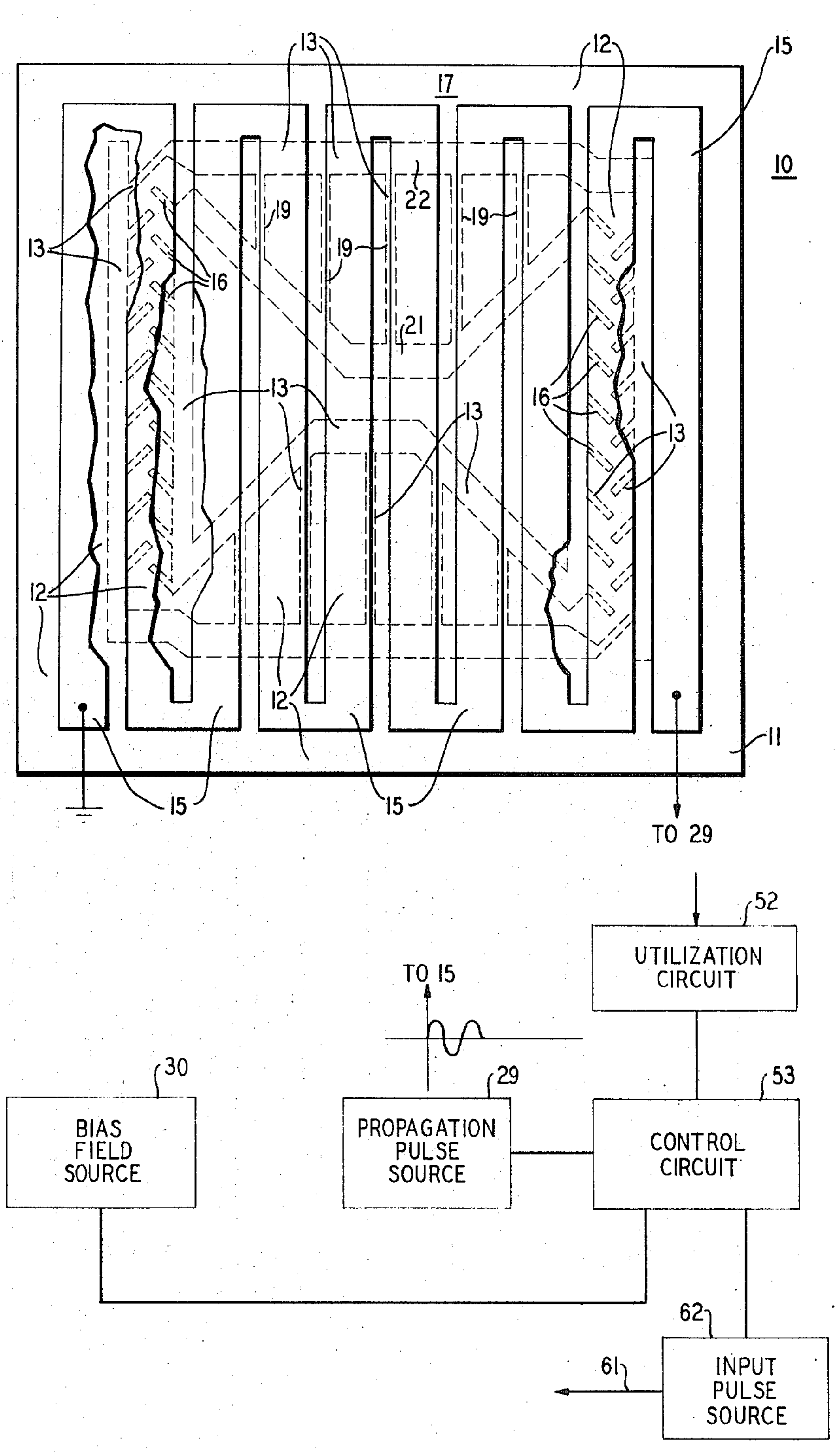
FIG. 1 is a schematic representation of a domain propagation arrangement in accordance with this invention.

FIG. 1 shows a domain propagation arrangement 10 in accordance with this invention. The arrangement comprises a layer 11 of material in which single wall domains can be moved. Layer 11 is structured into regions of high and relatively low moment ($4\pi Ms$) designated 12 and 13, respectively, in the figure.

The low moment regions are formed in a layer 11 initially of uniformly high moment by the formation of a silicon (over) lay in the pattern of region 13 as shown in FIG. 1 followed by a step of heating at about 600° C. the heating step causes an oxygen gettering effect which, in turn, permits a redistribution of the rare earth ions wthin layer 11.

An electrical conductor 15 overlies fingers 16 of the low moment region 13 defining straight channel portions of the type described in the above-mentioned copending patent application. The present invention is directed primarily at the portion 17 in FIG. 1 where the legs of conductors 15 are interleaved with elongated low moment portions 19 of region 13.

Figure 2:
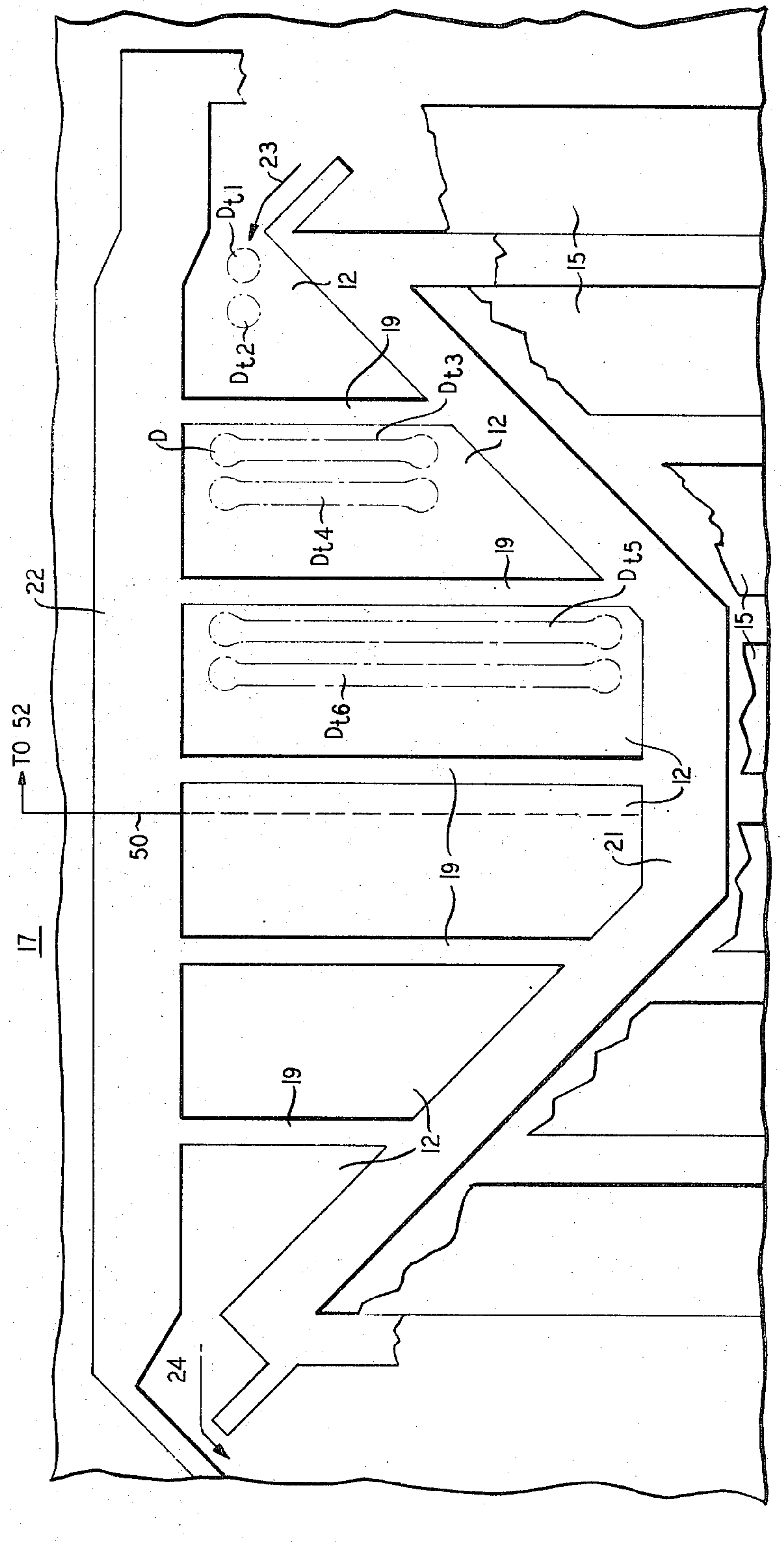
FIGS. 2, 4 and 5 are schematic representations of portions of the arrangement of FIG. 1 showing magnetic conditions therein during operation.

Portions 19 are oriented vertically as viewed and terminate at side rail portions 21 and 22 of FIG. 1 forming a generally horizontal ladder-like arrangement shown enlarged in FIG. 2. The side rails of this arrangement constrain, in a lateral direction, any domain entering at arrow 23 and exiting at arrow 24 in FIG. 2 when those domains are expanded along the legs of conductor 15 by the drive fields. In this connection, an edge of each of the legs of conductor 15 of turn area 17 is aligned with the center line of an elongated portion 19 as can be seen in FIG. 2. When the conductor is pulsed, any domain entering at 23 is driven by the conductor field gradient, passing through a low moment region to a position along the conductor as shown by the elongated domain D in FIG. 2. Portions 19 have widths typically about equal to the collapse diameter of a domain, or less, in layer 11 in order to permit operation over a wide range of drive fields. When the drive field is terminated, the domain moves to the left as viewed because of a static field gradient due to the difference in the moments of that portion 19 and the adjacent portions (high moment) region 12.

Figure 3:
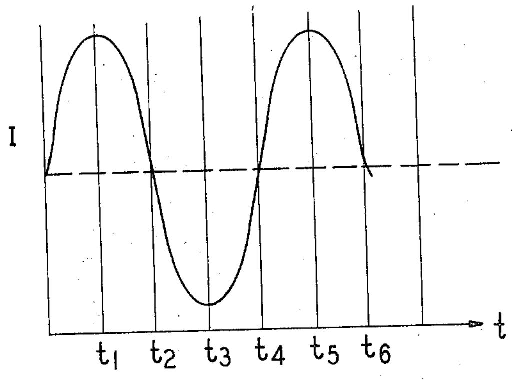
FIG. 3 is a graph of the waveform for driving the arrangement of FIG. 1.

FIG. 3 is a graph of current I versus time $t$ in conductor 15 showing the sign wave form of the current supplied by a source represented by block 29 of FIG. 1. Times $t1$ to $t6$ are identified on that wave form and the positions of domain D for each of those times is shown in FIG. 2. The designations of the domain for each of those times includes the corresponding time indication to facilitate comparison. The pulseform is the same pulseform which causes domain prpagation along the straight line sections of conductor 15 as disclosed in the aforementioned copending patent application. Consequently, conductor 15 may comprise an extension of the conductor in the straight line section as is shown in FIG. 1. Moreover, the distorted shape of portion 21 of FIG. 2 ensures that a domain entering at arrow 23 and exiting at arrow 24 of FIGS. 2, 4, and 5 has a diameter comparable with those moved along those straight line sections, an operating diameter determined by a bias field supplied by a source represented by block 30 of FIG. 1.

Figure 4:
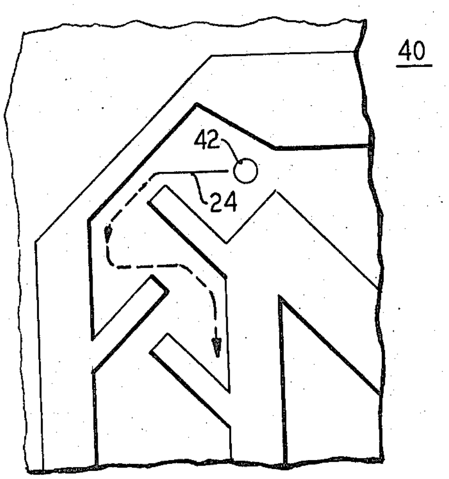
Figure 5:
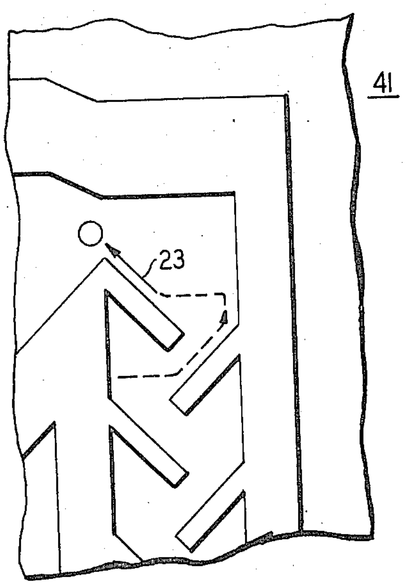

The compatibility of the expansion turn 17 of FIG. 2 and the straight line sections of the arrangement is ensured by the geometry of the forbidden regions (13) at positions 40 and 41 of FIG. 2 as shown in FIGS. 4 and 5, respectively. The geometry of the forbidden regions is designed to offset in the selected direction of movement a domain moved into the areas shown in FIGS. 4 and 5 by the next preceding pulse on conductor 15. Thus a pulse on conductor 15 of FIG. 2 moves a domain to position 42 for exit at 24 of FIG. 4 followed by downward movement of the domain along the straight line portion of the channel as indicated by the broken arrow in FIG. 4 in response to further alternations of current in conductor 15. Similarly, a pulse in conductor 15 advances a domain upward to the position shown in FIG. 5 for the sequence of *t1* to *t6* as discussed above. It should be clear at this juncture that the expansion turn is operative to move domains clockwise around a closed loop completed by two turn arrangements of FIG. 2 as shown in FIG. 1.

A familiar magnetoresistance element positioned as indicated at 50 in FIG. 2 is operative to apply a signal to a utilization circuit represented by block 52 of FIG. 1 indicative of the passage of a domain thereby. Typically, such signals are triggered by a strobing (interrogate) pulse applied in a well-understood manner to the magnetoresistance element under the control of a control circuit 53 of FIG. 1 and synchronized with the propagation (drive) pulses. Information in arrangements of this type is represented as the presence (binary one) or absence (binary zero) of a domain in a stage. Consequently, the presence of a domain at 50 of FIG. 2 indicates a binary one and results in a signal to circuit 52.

The employment of a sinusoid-shaped conductor loop of varying amplitude with legs offset and interleaved with low moment strip portions of varying lengths to effect domain enlargement in a turn area provides advantages with respect to speed of operation. This is particularly apparent when contrasted to the structure of U.S. Pat. No. 3,564,518 of R. F. Fischer, issued February 16, 1971. That patent discloses a structure which employs an arrangement of magnetically soft dots offset from the positions to which a serpentine conductor moves domains when pulsed. Movement in each instance due to the dots is because of the localized reduction of the magnetostatic field by means of flux closure through the dots, an effect which is of limited strength since the bubble's magnetostatic energy can be reduced at most by a factor of 2. Consequently, the effect is of limited use at high drive fields. In accordance with an aspect of this invention, regions of relatively low moment can differ from adjacent regions of high moment by an arbitrary amount whereby the offset force due to said difference can be made arbitrarily large leading to very high speed operation. Yet magnetically soft elements can also be designed to permit domain expansion, as does a succession of high and low moment regions, locally modifying the otherwise uniform bias field to this end in accordance with an aspect of this invention.

Domains so moved and expanded for detection are introduced at an input position (not shown) by a suitable input arrangement represented by arrow 61 of FIG. 1 and block 62 entitled input pulse source. A familiar domain annihilator (also not shown) is employed typically in closed loop arrangements of this type to eliminate information for replacement.

What has been described is considered merely illustrative of the principles of this invention. Therefore, varied modifications thereof can be devised by those skilled in the art in accordance with those principles within the spirit and scope of this invention as encompassed by the following claims.

What is claimed is:

1. A magnetic arrangement comprising a layer of material in which single wall domains can be moved, said layer including successive regions of high and low magnetic moment along an axis of domain movement, an electrical conductor comprising interconnecting leg sections coupled to said layer and being disposed such that consecutive ones of said legs are offset with respect to consecutive ones of said low moment regions along said axis of movement in a manner to move domains along said axis in response to pulses of alternating polarity applied to said conductor.

2. An arrangement in accordance with claim 1 wherein said low moment regions are sufficiently narrow to permit domains to be driven thereacross.

3. An arrangement in accordance with claim 2 wherein consecutive legs of said conductor increase then decrease in length along a direction vertical to said axis of movement.

4. An arrangement in accordance with claim 3 wherein said successive regions of low moment and high moment are increasingly longer and then shorter along a direction vertical to said axis of movement for first expanding a domain from an operating diameter and then returning a domain to said operating diameter at first and second positions, respectively.

5. An arrangement in accordance with claim 4 wherein said layer also includes first and second low moment regions extending along said axis of moment to either side thereof and being disposed to constrain the expansion of said domains.

6. An arrangement in accordance with claim 5 wherein said first low moment region is so disposed and of a geometry to define with said second low moment region said low moment regions of differing lengths therebetween.

7. An arrangement in accordance with claim 6 wherein said low moment regions of said succession of high and low moments regions have widths about equal to the collapse diameter of a domain in said layer.

8. A magnetic arrangement comprising a layer of material in which single wall domains can be moved, an electrical conductor comprising interconnecting leg sections coupled to said layer, a succession of elements each offset with respect to a consecutive one of said leg sections along an axis of movement, each of said elements having a geometry and properties to modify locally a bias field determinative of an operating diameter for domains in said layer over areas of different lengths transverse to said axis.

9. A magnetic arrangement in accordance with claim 8 wherein said layer is characterized by a first magnetic moment and said elements are regions in said layer characterized by a second magnetic moment lower than said first magnetic moment.

* * * * *